H. E. IVES.
ARTIFICIAL LIGHTING.
APPLICATION FILED MAR. 10, 1913.

1,086,534.

Patented Feb. 10, 1914.

WITNESSES:
Rob. R. Ketchel.
K. M. Gilligan

INVENTOR
Herbert E. Ives
BY
Augustus B. Stoughton.
ATTORNEY.

UNITED STATES PATENT OFFICE.

HERBERT E. IVES, OF MOUNT AIRY, PENNSYLVANIA, ASSIGNOR TO THE UNITED GAS IMPROVEMENT COMPANY, OF PHILADELPHIA, PENNSYLVANIA, A CORPORATION OF PENNSYLVANIA.

ARTIFICIAL LIGHTING.

1,086,534.  Specification of Letters Patent.  Patented Feb. 10, 1914.

Application filed March 10, 1913.  Serial No. 753,261.

*To all whom it may concern:*

Be it known that I, HERBERT E. IVES, a citizen of the United States, and a resident of Mount Airy, in the county of Philadelphia and State of Pennsylvania, have invented certain new and useful Improvements in Artificial Lighting, of which the following is a specification.

The principal object of the present invention is to improve indirect or semi-indirect lighting in such a way that the general effect of the illumination of a room more nearly resembles daylight illumination by means of windows and in such a way that the sensation of being in a well is done away with, while at the same time the source of artificial light may not shine directly in the eyes although a larger proportion of direct light is utilized for illumination.

The invention will be claimed at the end hereof, but will be first described in connection with the embodiment of it chosen for illustration in the accompanying drawings, in which—

Figure 1:
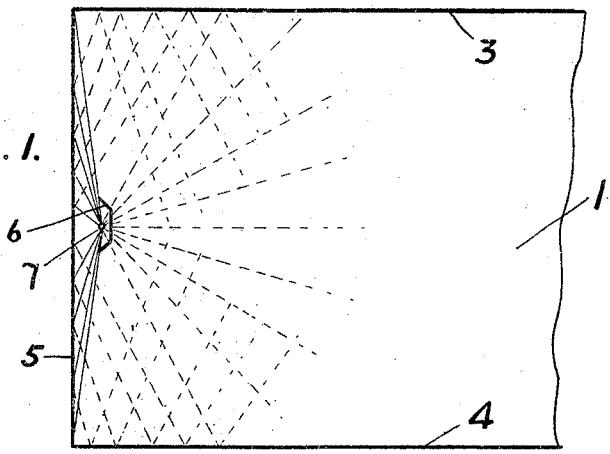
Figure 4:
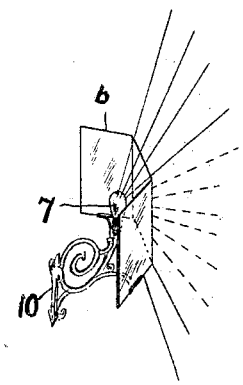
Figure 2:
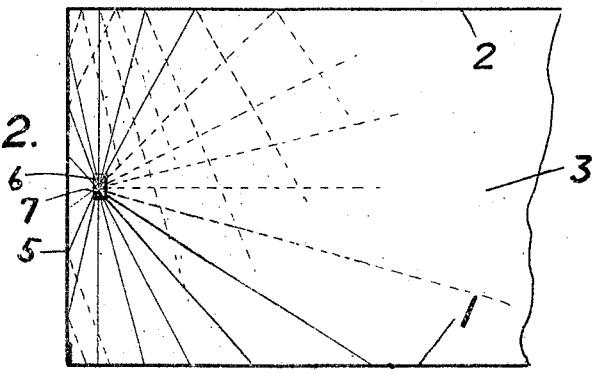
Figure 5:
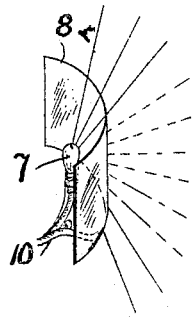
Figure 3:
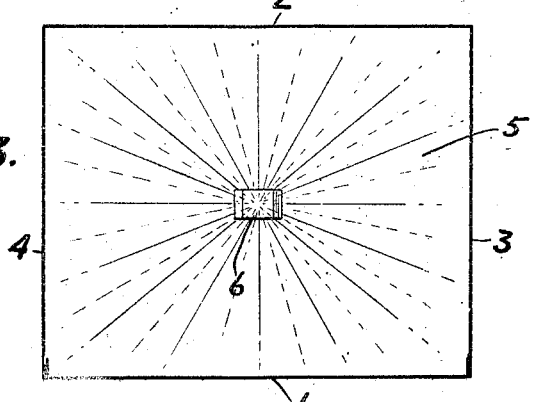
Figure 6:
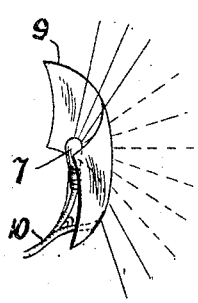

Figure 1, is a plan, Fig. 2, an elevation and Fig. 3, an end view of a part of a system of artificial lighting embodying features of the invention, and Figs. 4, 5, and 6, are perspective views illustrating details of construction.

In the drawings 1 is the floor, 2 the ceiling, 3 and 4 the side walls and 5 the end wall of a room, apartment or chamber to be lighted. An indirect or semi-indirect source of illumination is applied to a vertical wall of the room, the number of sources so applied may be increased or diminished and they may be applied to any or all of the vertical walls and to any appropriate part thereof. In Figs. 1 to 3, but one source of such illumination is shown.

The source of illumination may vary. Electric lamps are shown in the drawings, but they are illustrative and can be replaced by gas lights if desired. Associated with the electric lamps are shades or reflectors, the general purpose of which is to permit the direct light from the source to fall back upon the side wall and upon the floor and ceiling and to otherwise shield the source either totally or to such a degree that the shade or screen, generally speaking, does not present a brightness in any way comparable with the direct light from the source and should be of approximately of the intrinsic brilliancy or less than that of the illuminated wall as seen adjacent thereto. Evidently the illumination is indirect or semi-indirect, but since it is applied to a vertical wall and to the floor and ceiling, the effect is substantially that of illumination through windows by daylight. In consequence of this a room artificially lighted in accordance with my invention is acceptable and does not give rise to the effect that one has with indirect or semi-indirect illumination applied to a ceiling.

According to my invention a comparatively large proportion of direct light may be utilized for illumination because it can be permitted to shine upon the floor and ceiling without coming into the eyes of an occupant of the room or chamber that is illuminated.

The shade or reflector 6, shown in Fig. 4, and in Figs. 1, 2, and 3, consists of three planes, of which the end planes form an obtuse angle with the middle plane and the source of illumination 7 is arranged within the concavity of the screen or shade. The direct light passes over the top and bottom of the screen or shade to the ceiling and floor and over the ends and back of the screen or shade against the vertical wall. The height of the shade is such that direct light on its way to the ceiling or floor may not under ordinary conditions reach the eyes of the occupants of the room.

As shown in Fig. 5, the screen or shade 8 is curved, but the general construction and arrangement are as has been described in connection with Fig. 4.

As shown in Fig. 6, the screen or shade 9 is a warped surface and considered horizontally the source is within its concavity although this is not true considered vertically. Where the shade or screen is semi-translucent and semi-indirect lighting is employed the shade may be decorated with any suitable or appropriate design. The lamp 7 is, of course, near the vertical side wall and it and the shade may be mounted upon a suitable bracket or like fitting, 10.

It may be said that by the described system of lighting or invention, it is possible to produce very artistic lighting effects, illuminating principally those portions of the room from which the best results can be obtained while at the same time the general effect is that of daylight as distinguished from an intense ceiling illumination which produces the general effect of being in a well so far as the occupants of the room are concerned. Furthermore a good deal more direct light can be utilized which of course is advantageous because the direct light is directed to the floor and ceiling and the eyes of the occupant are not likely to be in either of these positions, so that this economy in lighting is effected without subjecting the eyes to unpleasant direct lights. In fact, practically all of the floor can be illuminated by direct light.

While it is evident that modifications may be made in details of construction and arrangement, still—

Having thus described the nature and objects of my invention what I claim as new and desire to secure by Letters Patent:

1. A system of artificial illumination for interiors which comprises the combination of a source of light near and in front of a vertical wall of the interior, a concave shade or diffusive reflector arranged in front of the source of light and having the latter within a plane passed through its ends and of such height in proportion to width that direct light passes over the top and bottom to the floor and ceiling but not over the ends to the adjacent side walls, said shade or reflector being of such degree of translucency as to be of approximately the intrinsic brilliancy of the illuminated wall as seen adjacent thereto, substantially as described.

2. A system of artificial illumination for interiors which comprises the combination of a source of light near and in front of a vertical wall of the interior, a concave shade or diffusive reflector arranged in front of the source of light and having the latter within a plane passed through its ends and of such height in proportion to width that direct light passes over the top and bottom to the floor and ceiling but not over the ends to the adjacent side walls, substantially as described.

In testimony whereof I have hereunto signed my name.

HERBERT E. IVES.

Witnesses:
CLIFFORD K. CASSEL,
FRANK E. FRENCH.